Figure 1:
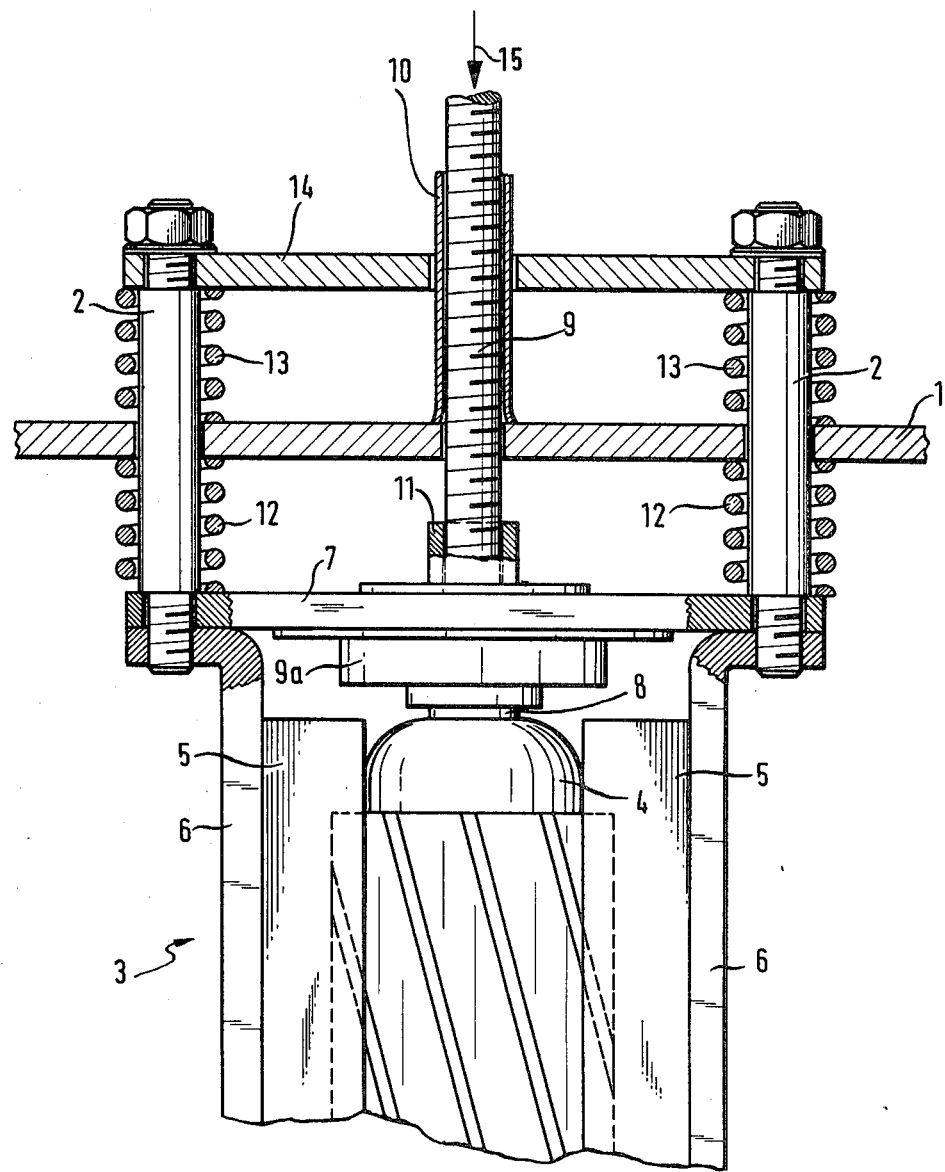

United States Patent [19]
Hess

[11] 3,987,323
[45] Oct. 19, 1976

[54] ELECTRIC MOTOR WITH RESILIENTLY MOUNTED ROTOR

[75] Inventor: Hans-Peter Hess, Coburg, Germany

[73] Assignee: Metallwerk Max Brose & Co., Coburg, Germany

[22] Filed: Oct. 23, 1975

[21] Appl. No.: 625,306

[30] Foreign Application Priority Data
Nov. 8, 1974 Germany............................ 2453163

[52] U.S. Cl.................................... 310/80; 310/91
[51] Int. Cl.² ......................................... H02K 7/06
[58] Field of Search .................. 310/80, 83, 90, 91, 310/77, 51

[56] References Cited
UNITED STATES PATENTS

| | | | |
|---|---|---|---|
| 3,152,960 | 10/1964 | Alfred.............................. | 310/112 X |
| 3,278,774 | 10/1966 | Roller et al. ....................... | 310/80 X |
| 3,435,391 | 3/1969 | Straub.............................. | 310/80 X |
| 3,824,420 | 7/1974 | Stegeman............................. | 310/80 |
| 3,855,487 | 12/1974 | Boisseau .............................. | 310/80 |
| 3,898,399 | 8/1975 | Yasui.................................. | 310/80 X |

*Primary Examiner*—Mark O. Budd
*Attorney, Agent, or Firm*—Hans Berman

[57] ABSTRACT

The motor of an electric window or sunroof operating mechanism for a motorcar has a rotor axially movable on a normally fixed base against the restraint of compression springs. A nut on the tubular motor shaft threadedly engages a cable partly received in the shaft. The cable is longitudinally guided on the base and secured against rotation so that it moves longitudinally to open or close the associated window or sunroof when the motor is energized. When the window or sunroof reaches one of its terminal positions, longitudinal movement of the cable is suddenly brought to a halt, and the motor is deenergized. The shock that would be caused by continued inertial motor rotation at arrested cable is absorbed by the compression springs, thereby significantly increasing the useful life of the mechanism.

10 Claims, 2 Drawing Figures

ELECTRIC MOTOR WITH RESILIENTLY MOUNTED ROTOR

This invention relates to electrically operated windows or sunroofs of a motor car, and particularly to an improved electric motor arrangement for use with such devices.

It is known, for example from German Pat. No. 1,077,564, to transmit the rotary movement of a tubular output shaft on an electric motor to a window or sunroof operating cable by means of a motion transmitting nut fixedly and coaxially mounted on the shaft and threadedly receiving the cable which is at least partly received in the shaft. The cable is longitudinally guided on the base plate for the motor and is secured against rotation.

Movement of the window or sunroof is stopped abruptly by abutments when the terminal open or closed position is reached, and the forces of sudden deceleration acting on the cable and on the associated motor shorten the useful life of the cable and of the motor although the motor is deenergized in the terminal positions of the window or sunroof, because inertia causes continued rotor movement after current is shut off. Similarly, starting of the motor from rest causes shock in the motor and the cable, and the frequently repeated starting and stopping of the operating mechanism is detrimental to the arrangement.

It is a primary object of this invention to improve the known operating mechanism in a manner to avoid or to reduce the potentially destructive forces acting on the cable, the motor, and associated elements of a window or sunroof mechanism of the type described.

According to the invention, a resilient mounting device secures the rotor of the electromotor to a normally fixed base member for rotation about the motor axis and resiliently resists axial movement of the rotor relative to the base member. A motion transmitting member mounted on the rotor for joint rotation carries threads about the axis of rotation which matingly engage threads on an elongated cable in a manner to move the cable in the direction of its elongation when the motion transmitting member rotates with the rotor. The cable is longitudinally guided on the base member.

Figure 2:
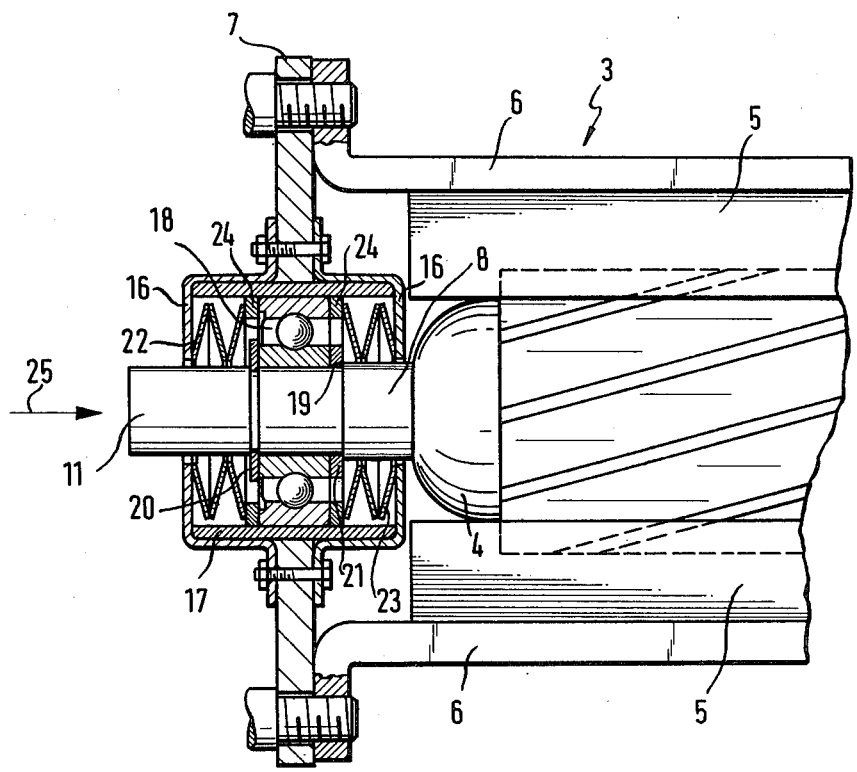

Other features, additional objects, and many of the attendant advantages of this invention will readily be appreciated from the following detailed description of preferred embodiments when considered with the accompanying drawing in which:

FIG. 1 shows a motor arrangement of the invention in fragmentary elevation and partly in section on the axis of rotation of the motor; and FIG. 2 illustrates a modification of the device of FIG. 1 in a corresponding partial view.

Referring initially to FIG. 1, there is shown a base plate 1 which may be an element of the rigid door frame enclosing the window to be operated, but not specifically shown. The smoothly cylindrical, axially central portions of two guide pins 2 are received in openings of the base plate 1 with sufficient clearance for free longitudinal movement. They carry a reversible electric motor 3 which includes a rotor or armature 4 and a field magnet assembly 5 fixedly mounted on a frame 6. Threads on each pin 2 fasten the frame 6 to a carrier plate 7.

The output shaft 8 of the motor 3 which is fixedly and coaxially fastened on the rotor 4 is tubular and is journaled in a bearing 9a on the carrier plate 7. The shaft 8 is coupled to a tension and torsion resistant cable 9 guided longitudinally in a tube 10 fixed on the base plate 1. Internal threads on a nut 11, fixedly or integrally fastened to the shaft 8, matingly engage external threads on the cable 9. The cable may pass through the entire axial length of the shaft 8 or be received therein otherwise in a manner not to impede its axial or longitudinal movement when the motor 3 is energized, rotation of the cable about its longitudinal axis being prevented by the tube 10 in a known manner, not explicitly shown.

Two helical compression springs 12 are wound about the guide pins 2 respectively in axially abutting engagement of their axial ends with the carrier plate 7 of the motor 3 and the base plate 1. Two additional compression springs 13, respectively coaxial with the springs 12, are interposed on the pins 2 under compressive stress between the base plate 1 and an abutment plate 14 which provides threadedly secured abutments on the respective free ends of the pins 2. The pair of closely juxtaposed ends of associated springs 12, 13 is thus secured by the resiliency of the springs to the base plate 1, while the pair of other ends of the same springs, offset from the juxtaposed ends in opposite axial directions, is similarly secured to the motor 3. The four springs 12, 13 yieldably bias the guide pins 2 and the motor 3 suspended from the guide pins toward the illustrated position.

When the window or sunroof drivingly connected to the cable 9 in a known manner, not shown, reaches a terminal position, the motor 3 is deenergized by a non-illustrated limit switch, but inertial rotation of the rotor 4 continues briefly. If the springs 12, 13 were replaced by rigid spacers, forces generated by the threaded engagement of the suddenly stopped cable 9 and the continued inertial movement of the rotor 4 would cause sudden shock to the cable, the motor, and associated elements. In the illustrated device, the shock is absorbed by the springs 12, 13 and gradually released after the rotor 4 has come to a standstill in a manner which cannot affect the useful life of the cable 9 nor of any component of the motor 3.

It will be understood that the portion of the frame 6 omitted from FIG. 1 is provided with a bearing similar to the bearing 9a for the non-illustrated end of the shaft 8. The rotor 4, the field magnet 5, the frame 6, and the carrier plate 7 are axially secured relative to each other and jointly move axially with the pins 2 as indicated by the arrow 15.

In the modified embodiment of the invention partly shown in FIG. 2, the otherwise unchanged rotor 4 of the motor 3 is capable of limited axial movement relative to the field magnet 5 which in turn is fixedly fastened to a frame 6 and a carrier plate 7 in a manner not significantly different from the structure described with reference to FIG. 1. The stationary parts of the motor 3, that is, the plate 7 and associated elements 5, 6, also provide the stationary base of the motor arrangement. The output shaft 8 and its nut 11 are fixed to the rotor 4 and may move axially relative to the base structure.

A split bearing casing 16 whose halves are mounted on opposite faces of the plate 7 is lined with an axially fixed bushing 17. The outer ring of a ball bearing 18 slidably engages the inner face of the bushing 17 while the inner bearing ring is axially secured on the shaft 8 between a collar 19 of the shaft and a split ring 20 of spring metal, a washer 21 being interposed between the inner bearing ring and the shoulder 19. The bearing 18, the shaft 8, and the rotor 4 are biased toward the illustrated axial position by two stacks 22, 23 of Belleville washers or cup springs abutting against the two halves of the bearing casing 16 and two washers 24 in contact with the outer ring of the bearing 18.

It will be understood that the non-illustrated end portion of the shaft 8 is journaled in a sleeve bearing (not shown) on the omitted portion of the frame 6 which permits axial movement of the entire rotor assembly against the restraint of the cup springs 22, 23. Shock exerted on the rotor assembly in the direction of the arrow 25 by a cable threadedly engaging the nut 11 in a manner shown in FIG. 1 but not again illustrated in FIG. 2 is absorbed by the cup springs 22, 23 as by the helical compression springs 12, 13.

The choice of wire springs, as shown in FIG. 1, or of Belleville washers, as illustrated in FIG. 2, is controlled by the operating characteristics of the entire window or sunroof operating mechanism in a manner obvious to those skilled in the art, and buffers of a suitably hard grade of rubber may be substituted for either type of metallic spring without affecting the basic mode of operation of the device.

It should be understood, therefore, that the foregoing disclosure relates only to a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. An electric motor arrangement comprising:
   a. a base member;
   b. an electric motor including a stator and a rotor connected to said stator for rotation about an axis when said motor is energized;
   c. resilient mounting means securing said rotor to said base member for rotation about said axis and yieldably resisting axial movement of said rotor relative to said base member;
   d. a motion transmitting member mounted on said rotor for joint rotation;
   e. an elongated cable, said cable and said motion transmitting member carrying matingly engaged threads about said axis for moving said cable in the direction of elongation thereof when said motion transmitting member rotates with said rotor; and
   f. guide means on said base member for longitudinally guiding said cable.

2. An arrangement as set forth in claim 1, wherein said electric motor further includes a carrier, said stator and said rotor being secured on said carrier against axial movement, and said mounting means include two guide members fixedly fastened to said carrier and extending therefrom in the direction of said axis through respective openings in said base member, an abutment on a portion of each guide member remote from said carrier, and two resilient elements associated with each guide member, one of said resilient elements being interposed between said carrier and said base member, and the other resilient element being interposed between said base member and the abutment on the associated guide member.

3. An arrangement as set forth in claim 2, wherein said rotor includes a hollow shaft, said motion transmitting member being internally threaded and engaging external threads on said cable, said cable being partly received in said hollow shaft.

4. An arrangement as set forth in claim 3, wherein said resilient elements are interposed under compressive stress between said carrier and said abutment respectively and said base member.

5. An arrangement as set forth in claim 1, wherein said electric motor includes an armature shaft fixedly mounted on said rotor, and said mounting means include a bearing receiving said shaft for rotation about said axis and secured against axial movement relative to said shaft, guiding means on said base member guiding axial movement of said bearing toward and away from a predetermined axial position, and yieldably resilient biasing means biasing said bearing toward said position.

6. An arrangement as set forth in claim 5, wherein said biasing means are interposed under compressive stress between said guiding means and said bearing.

7. An arrangement as set forth in claim 1, wherein said resilient mounting means include two coaxial, axially offset, helical springs having each two axial ends, said ends constituting a first pair of axially closely juxtaposed ends and a second pair of ends axially offset from said juxtaposed ends in opposite directions, one of said pairs being secured to said rotor for joint axial movement, and the other pair being secured to said base member.

8. An arrangement as set forth in claim 7, wherein said one pair is said first pair.

9. An arrangement as set forth in claim 7, wherein said one pair is said second pair.

10. An arrangement as set forth in claim 7, wherein said springs are stressed in compression in all operative, relative positions of said base and of said rotor.

* * * * *